US010572437B2

(12) United States Patent
Srivastava

(10) Patent No.: US 10,572,437 B2
(45) Date of Patent: Feb. 25, 2020

(54) ADAPTIVE READ TECHNIQUE FOR MULTI-DROP BUS

(71) Applicant: Intel Corporation, Santa Clara, CA (US)

(72) Inventor: Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 298 days.

(21) Appl. No.: 15/465,533

(22) Filed: Mar. 21, 2017

(65) Prior Publication Data

US 2018/0275713 A1 Sep. 27, 2018

(51) Int. Cl.
*G06F 13/42* (2006.01)

(52) U.S. Cl.
CPC ................................ *G06F 13/4291* (2013.01)

(58) Field of Classification Search
CPC combination set(s) only.
See application file for complete search history.

(56) References Cited

U.S. PATENT DOCUMENTS 4,766,596 A * 8/1988 Michels-Krohn ..... H04L 12/433 340/2.7
8,266,347 B2 * 9/2012 Chu .......................... H04L 7/02 710/31
10,031,882 B2 * 7/2018 Srivastava .......... G06F 13/4291
2017/0017587 A1 * 1/2017 West .................. G06F 13/4068
2018/0173665 A1 * 6/2018 Mishra .................. G06F 13/364

* cited by examiner

*Primary Examiner* — Zahid Choudhury
(74) *Attorney, Agent, or Firm* — Green, Howard & Mughal LLP

(57) ABSTRACT

An apparatus is provided which comprises: a data circuitry to send and receive data to and from one or more devices coupled to the data circuitry via a first transmission line; and a first adjustable clock buffer coupled to the data circuitry, wherein the first adjustable clock buffer is to adjust a delay to an edge of a read clock according to a response time of the one or more devices.

18 Claims, 7 Drawing Sheets

ADAPTIVE READ TECHNIQUE FOR MULTI-DROP BUS

BACKGROUND

MIPI I3C$^{SM}$ is developed by the MIPI Alliance Sensor Working Group (e.g., specification released on Jan. 9, 2017) which defines the Multi-drop bus technology targeting for future sensor device communications to offload sensing data to the host. Sensing devices use MIPI I3C$^{SM}$ bus to communicate sensing data information to send to MIPI I3C$^{SM}$ compliant Master. One of the challenges of the multi-drop bus is to meet the read timing requirements for longer platform topology or board trace length.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
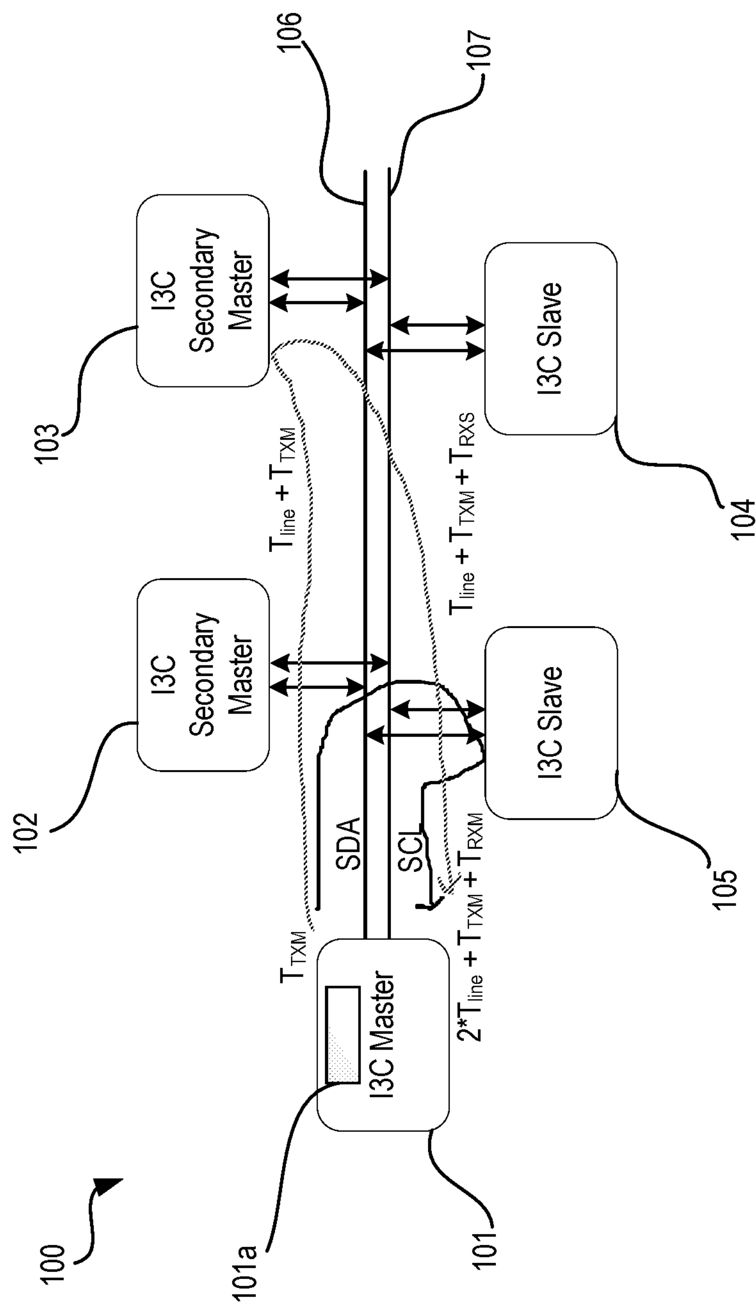
FIG. 1 illustrates a system having a MIPI I3C$^{SM}$ compliant Sensor Multi-Drop Bus, according to some embodiments of the disclosure.

Read operation of the MIPI I3C$^{SM}$ compliant bus mostly depends on Master transmitter (TX) and receiver (RX) and Slave (TX/RX) response times, and also transmission line ($T_{Line}$) parameters, either board induced time of fight or due to cable. Here, the term "Master" refers to a device or apparatus which controls the bus. For example, the master device may drive MIPI I3C$^{SM}$ compliant SCL line and is responsible for bus initialization and address assignment, (e.g., read or write or address assignment). The term "Slave" refers to a device or apparatus which initiates the bus transaction after winning bus arbitration. For example, the slave device may only transmit and receive on MIPI I3C$^{SM}$ compliant SDA line after winning bus arbitration.

To meet the read AC timing requirements, the $T_{read}$ window (e.g., for maximum operating bus 12.5 MHz (40 nanoseconds (ns))) should be $T_{TXM}+2*T_{Line}+T_{RXM}+T_{RXS}+T_{TXS}+T_{Setup}<0.5*T_{SCL}$, where $T_{TXM}$ is the Master transmitter propagation delay, $T_{Line}$ is the transmission line propagation delay from the Master transmitter to the Slave receiver or the Slave transmitter to the Master receiver, $T_{RXM}$ is the Master receiver propagation delay, $T_{RXS}$ is the Slave receiver propagation delay (or response time), $T_{TXS}$ is the slave transmitter propagation time, $T_{Setup}$ is the internal setup time for the Master to reliably receive slave data, and $T_{SCL}$ is the clock period of the clock which is forward from the Master to the Slave on SCL line.

Various embodiments describe a read timing calibration circuit technique which assists in meeting read timing requirements without impacting bus operating frequency. However, the embodiments are not limited to read timing calibration. The concepts and techniques described for adaptively adjusting a read clock delay can also be used to adaptively adjust a write clock delay according to various embodiments. In one such embodiment, the write timing requirements are met without impacting bus operating frequency. In some embodiments, adaptive read/write tuning is achieved by: 1) measuring delay after sending a clock, from the master device to the slave devices, to the received output detect high, which is an indication of the slave response, and 2) using digitally measured delay information to adjust the propagation delay of a read clock delay buffer and to hold or stall the next write information during read operation.

The apparatus of various embodiments is better than known solutions. For example, the adaptive read/write technique of the various embodiments may not require prior platform topology information. The apparatus of the various embodiments is useful for Internet-of-Things (TOT) and/or automotive solution space where longer cable length is used (e.g., more than two to five meters). The apparatus of the various embodiments may not need any prior configurations. The apparatus of the various embodiments is a simple and robust digital solution which can be scaled over process technology nodes. The apparatus of various embodiments can be implemented using few gate counts with the reusability of data path and clock path. The apparatus of various embodiments is applicable to MIPI I3C$^{SM}$. However, the various embodiments are not limited to MIPI I3C$^{SM}$ and can be used for any multi-drop communication bus.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 illustrates system 100 having a MIPI I3C$^{SM}$ compliant Sensor Multi-Drop Bus, according to some embodiments of the disclosure. System 100 comprises MIPI I3C$^{SM}$ compliant Master device 101, MIPI I3C$^{SM}$ compliant Secondary Master devices 102 and 103, MIPI I3C$^{SM}$ compliant slave devise 104 and 105, data line (SDA) 106 (e.g., a multi-drop bus), and clock line (SCL) 107. System 101*a* is adaptive read/write calibration logic.

The shortest read path is the dark propagation path from Master device 101 to Slave device 105 and back to Master device 101. Meeting the read timing requirements for this shortest read path is generally non-challenging. The longest read path in this example is the gray path which originates from Master device 101, passes through Slave device 104, and back to Master device 101. The length of the longest path could be in the range of more than 20 inches (e.g., Time greater than 4 ns) for board traces or if cable length is more than 1 meters long (e.g., Time greater than 10 ns). Meeting read timing requirements for such a long path is challenging and thus results in read path timing violations. Absent calibration logic 101*a*, one of the solutions to solving the read timing failure is to lower the operating frequency which will increase the read timing margin but at the cost of lower bus efficiency.

Various embodiments describe a read/write timing calibration circuit 101*a* which assists in meeting read timing requirements without impacting bus operating frequency. However, the embodiments are not limited to read timing calibration. The concepts and techniques described for adaptively adjusting a read clock delay can also be used to adaptively adjust a write clock delay according to various embodiments. In one such embodiment, the write timing requirements are met without impacting bus operating frequency. In some embodiments, adaptive read/write tuning is achieved by: 1) digitally measuring a delay after sending a clock from Master 101 to the slaves 104/105 and then detecting an output at Master 101 (e.g., a high logic level) indicating that the slave did receive the clock, and 2) using digitally measured delay information to adjust the delay of a read clock delay buffer and to hold or stall the next write information during read operation.

Figure 2:
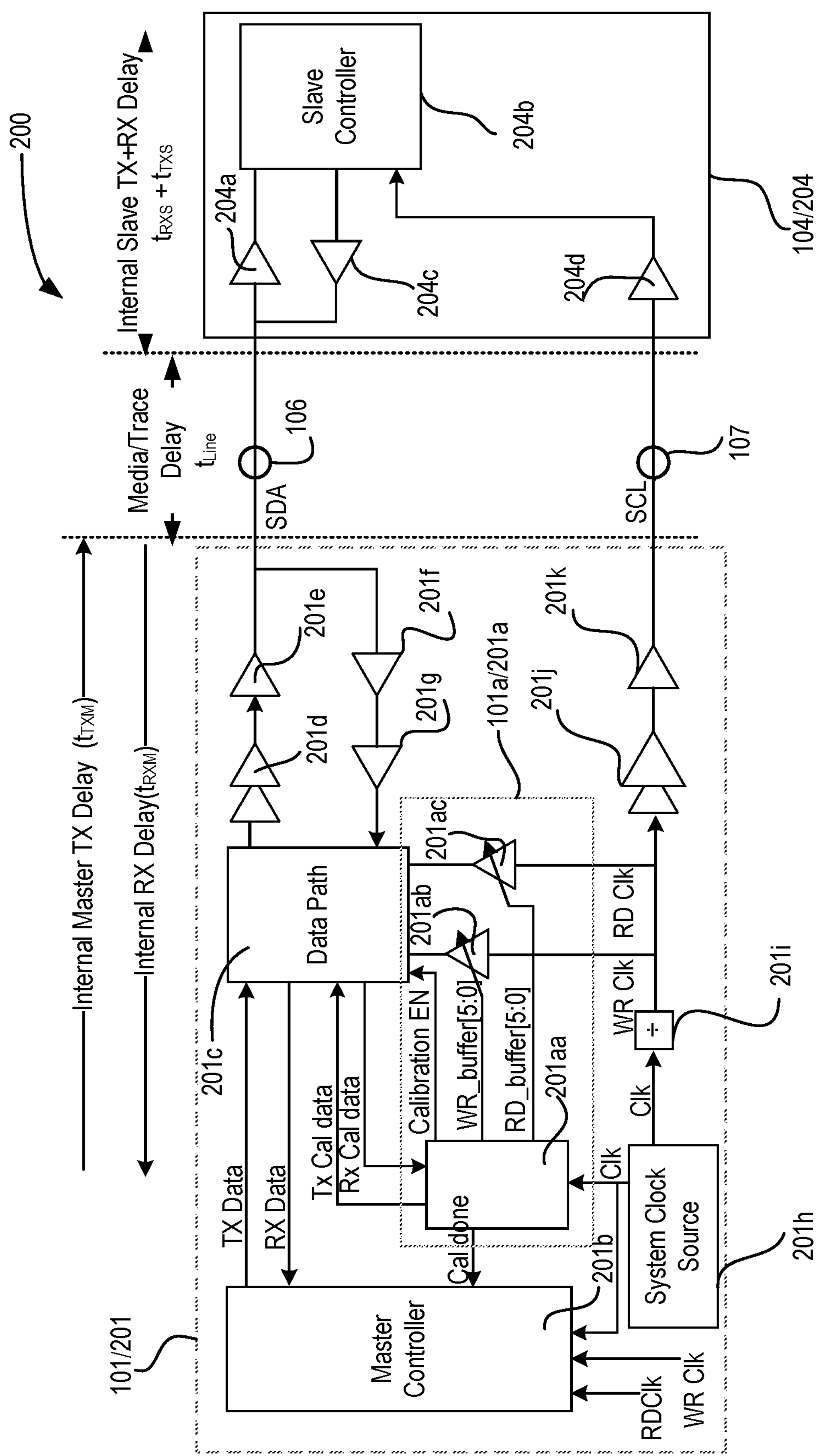
FIG. 2 illustrates a high level apparatus of adaptive read technique for multi-drop bus technology, according to some embodiments of the disclosure.

FIG. 2 illustrates a high level apparatus 200 of the adaptive read technique for multi-drop bus technology, according to some embodiments of the disclosure. It is pointed out that those elements of FIG. 2 having the same reference numbers (or names) as the elements of any other figure can operate or function in any manner similar to that described, but are not limited to such.

Apparatus 200 comprises master device 101/201 and slave device 104/204 coupled via data bus 106 and clock bus 107. In some embodiments, master device 101/201 (or master transceiver) comprises read/write clock calibration logic 101*a*/201*a*, Master Controller 201*b*, Data Path 201*c*, data buffer 201*d*, data transmitter 201*e*, data receive buffers 201*f* and 201*g*, System Clock Source 201*h*, clock divider 201*i*, clock buffer 201*j*, and clock transmitter 201*k*. In some embodiments, slave device 104/204 comprises data receiver 204*a*, Slave Controller 204*b*, transmitter 204*c*, and clock receiver 204*d*. For sake of not obscuring the invention, the various embodiments for Master device 101/201 and Slave device 104/204 are simplified.

In some embodiments, read/write clock calibration logic 101*a*/201*a* comprises calibration logic 201*aa*, adjustable write clock buffer 201*ab*, and adjustable read clock buffer 201*ac*. Here, the term "adjustable" generally refers to the ability to delay an edge and hence propagation delay of a buffer. The function of adjustability is indicated by the arrows through adjustable write clock buffer 201*ab* and adjustable read clock buffer 201*ac*. In some embodiments, calibration logic 201*aa* comprises one or more counters to count response time of slave device 104/204 after clock is sent by data transmitter 201*k* via clock bus 107. In some embodiments, the clock for the one or more counters is faster than the Write Clock (WR Clk) and Read clock (RD Clk) which are provided to clock buffers 201*ab* and 201*ac*, respectively.

In some embodiments, the propagation delay of the adjustable write clock buffer 201*ab* is adjusted by a control bus (e.g., a 6 bit control bus WR_buffer[5:0]). In some embodiments, adjustable write clock buffer 201*ab* is a current starved buffer or passive delay or clock based delay cell or voltage controlled delay cell where the drive of the buffer is adjustable by turning on/off source and sink transistors (e.g., p-type transistors as source transistor and n-type transistors as sink transistors) via the control bus.

In some embodiments, the propagation delay of the adjustable read clock buffer 201*ac* is adjusted by a control bus (e.g., a 6 bit control bus RD_buffer[5:0]). In some embodiments, adjustable read clock buffer 201*ac* is one of a current starved buffer, passive delay, clock based delay cell, or voltage controlled delay cell where the drive of the buffer is adjustable by turning on/off source and sink transistors (e.g., p-type transistors as source transistor and n-type transistors as sink transistors) via the control bus. A person skilled in the art would appreciate that various kinds of adjustable buffers voltage, current, clocked based or voltage controlled means can be used for adjusting propagation delay through the buffer.

The input to adjustable write clock buffer 201*ab* is WR Clk which is generated by System Clock Source 201*h*. The input to adjustable read clock buffer 201*ac* is RD Clk which is generated by System Clock Source 201*h*. In some embodiments, output clock Clk from System Clock Source 201*h* is divided down in frequency by divider 201*i* (e.g., Johnson Counter) to generate RD Clk and WR Clk. In some embodiments, System Clock Source 201*h* is any suitable clock generating source (e.g., a phase locked loop (PLL)). The output clock Clk is also used for logic (e.g., counters) of calibration logic 201*aa* and Master Controller 201*b*.

In some embodiments, Master Controller 201*b* comprises logic (e.g., finite state machine (FSM)) to generate data for transmission (e.g., TX Data) and logic to process received data (e.g., RX Data). Master Controller 201*b* comprises logic 201*b* which uses WR Clk to generate TX Data and uses RD Clk to process RX Data.

In some embodiments, Data Path 201*c* comprises logic (e.g., multiplexers, combinational logic, etc.) and samplers (e.g., flip-flops, latches, etc.) to sample data for transmission, and to sample data received from a slave device. The data for transmission is sampled by a delayed version of write clock (WR Clk), where WR Clk is delayed by adjustable delay buffer 201*ab*. The sampled data for transmission is then transmitted out to the first transmission line (or medium) or bus 106 to slave device 104/204 via buffers 201*d* and 201*e*. In some embodiments, Data Path 201*c* receives data from slave device 104/204 over the first transmission line (or medium) or bus 106 via buffers 201*g* and 201*f*. The received data is then sampled by the delayed version of read clock (RD Clk), where RD Clk is delayed by the adjustable delay buffer 201*ac*.

In some embodiments, write buffer 201*ab* and read buffer 201*ac* are calibrated before normal operation of the Master device 101/201. For example, Master device 101/201 enters a calibration mode and sends and receives data for calibration purposes. In some embodiments, Calibration logic 201*aa* generates Calibration EN (enable signal) for Data Path 201*c* so it enters the calibration mode after getting indication from Master controller 201*b*. Upon entering calibration mode, Calibration logic 201*aa* starts counting the round trip delay using the faster clock Clk (compared to divided RD Clk and WR Clk). Here, the term round trip delay generally refers to propagation delay for a clock to propagate from driver 201*k* to receiver 204*d*, where the clock is used to sample data, and the data path delay from driver 204*c* of Slave Device 104/204 to receiver 201*f*.

In some embodiments, the counter of Calibration logic 201*aa* begins to count up from zero after a clock is sent out from the clock path buffers 201*j* to transmitter 201*k* for transmission to Slave device 104/204. The various embodiments can also be realized by a down counter instead on an up counter. In some embodiments, the counter in Calibration logic 201*aa* begins to count up using the fast clock Clk and stops to count after detecting a response at buffer 201*g* from slave device 104/204 via transmission line 106. In some embodiments, Calibration logic 201*aa* digitizes delay information in terms of a count value. The count value can then be tallied with a corresponding delay setting via a lookup table (LUT) to determine the appropriate delay setting for the read/write buffers 201*ab/ac*, in accordance with some embodiments.

In some embodiments, the counter of Calibration logic 201*aa* stops counting after receiving a response back from slave device 104/204. In some embodiments, upon stopping the counter, a counting pulse is generated. In some embodiments, the counting pulse is proportional to a ratio of $T_{response}/T_{SysClock}$, where $T_{Response}$ is the sum of ($T_{TXM}$, $2{*}T_{Line}$, $T_{TRXM}$, $T_{RXS}$, $T_{TXS}$), and where $T_{SysClock}$ is the fast clock Clk generated by System Clock Source 201*h*. In some embodiments, Calibration logic 201*aa* uses the counter count value to adjust the propagation delay of read clock buffer 201*ac* to meet the read AC timing. At the same time, write data is held or stalled for this particular time. For example, when the propagation delay of read buffer 201*ac* is being adjusted, Data Path 201*c* refrains from sending any RX Data out for transmission.

In some embodiments, Calibration logic 201*aa* starts sending a clock to slave device 104/204 and at the same time enables its receiver in Data Path 201*c* to wait for the slave data and enable its counter which is running or operating at the faster clock Clk. Clock receiver 204*d* of slave device 104/204 receives the clock over second transmission line 107 and provides it to Slave Controller 204*b*. Slave Controller 204*b* then samples the received data. During the calibration mode, the sampled received data is then retransmitted via data transmitter 204*c* back to the Master Device 101/201, in accordance with various embodiments. Calibration logic 201*aa* then determines (via the count value) the time it took for the data sent by Master device 101/201 to be received back from Slave device 104/204, in accordance with some embodiments.

During this time, Calibration logic 201*aa* makes sure that the transmit path is disabled, in accordance with some embodiments. In some embodiments, slave device 104/204 after receiving the clock over second transmission line 107, sends an acknowledge (ACK) signal by causing the data on the first transmission line 106 to be high (e.g., SDA is raised high). The ACK signal is the received data in accordance with some embodiments. In some embodiments, after detecting the receiver output at receiver 201*g*, where the output is an indication that the slave device is responding through first transmission line 106, Calibration logic 201*aa* stops counting. The same process can also be applied to adjust write clock buffer 201*ab*, in accordance with various embodiments. Once write/read clock buffers 201*ab/ac* are adjusted to meet the timing requirements, Calibration Logic 201*aa* sends a "Cal done" message to Master Controller 101/201, in accordance with some embodiments. Here "Cal done" signal indicates whether calibration mode is complete. Master Controller 101/201 then ends the calibration mode and begins to send and receive normal data, in accordance with some embodiments.

Figure 3:
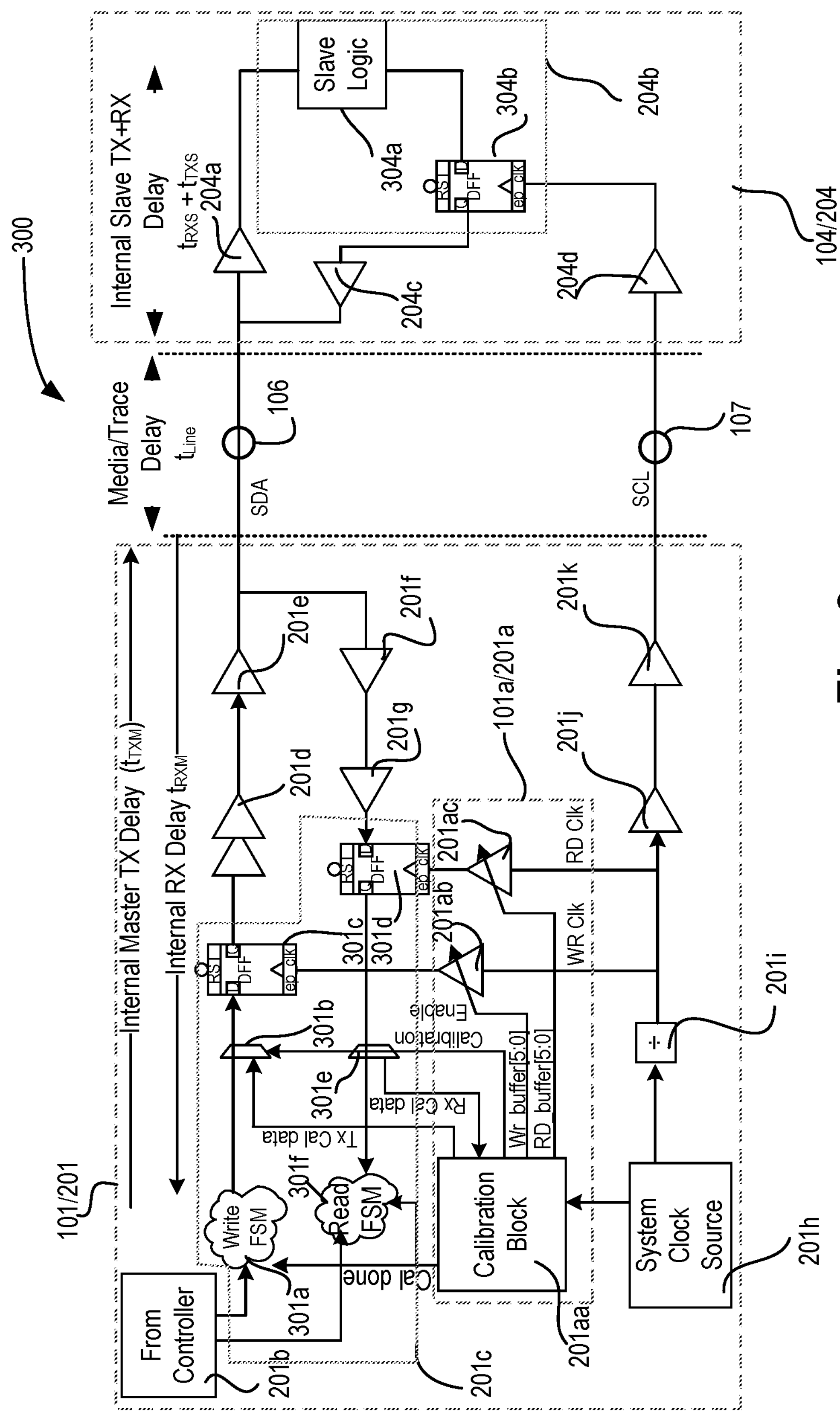
FIG. 3 illustrates a circuit diagram of FIG. 2, according to some embodiments of the disclosure.

FIG. 3 illustrates circuit diagram 300 of FIG. 2, according to some embodiments of the disclosure. It is pointed out that those elements of FIG. 3 having the same reference numbers (or names) as the elements of any other figure can operate or function in any manner similar to that described, but are not limited to such.

In some embodiments, Data Path 201*c* comprises finite state machine (FSM) 301*a*, multiplexer 301*b*, drive flip-flop 301*c*, receiver flip-flip 301*d*, multiplexer 301*e*, and read FSM 301*f*. In some embodiments, Slave Controller 204*b* comprises Slave Logic 304*a* and data sampler (e.g., flip-flop, latch, etc) 304*b*. In some embodiments, Slave Logic 304*a* processes the data received by transmitter 204*a* and provides data to be sent out to data sampler 304*b*. In some embodiments, data sampler 304*b* uses the clock forwarded by Master device 201 for sampling the data. This data is then sent to Master device 201, for example. In some cases, during the calibration mode, the output of sampler 304*b* is an ACK signal which causes data on first transmission line 106 to be pulled high.

During the calibration mode, "Calibration Enable" signal causes multiplexers 301*b* and 301*e* to send and receive calibration data instead of normal data. Here, the calibration data for transmitting is labeled as "Tx Cal data" while the calibration data which is received from the slave device 104/204 is labeled as "Rx Cal data". After "Tx Cal data" is selected by multiplexer 301*b*, transmitter flip-flip 301*c* samples the "Tx Cal data" using WR Clk provided by clock buffer 201*ab*. In some embodiments, propagation delay of write clock buffer 201*ab* is set to an initial value by "Wr buffer[5:0]". The data (e.g., ACK signal or any other indication) is then received by Master device 201 and sampled by receiver flip-flip 301*d* using RD Clk provided by read clock buffer 201*ac*.

In some embodiments, propagation delay of read clock buffer 201*ac* is set to an initial value by "Rd buffer[5:0]". This initial value is then adjusted by Calibration Block 201*aa* according to a LUT (not shown). Once calibration is complete, Calibration Block 201*aa* issues a "Cal done" signal for Read FSM 301*f* and Write FSM 301*a* so that those FSMs begin to send normal data and receive normal data for processing. In one embodiment, when "Cal done" signal is issued (e.g., "Cal done" signal is asserted"), "Calibration Enable" is de-asserted. As such, multiplexers 301*b* and 301*e* now allow normal data to be sent and received.

Figure 4:
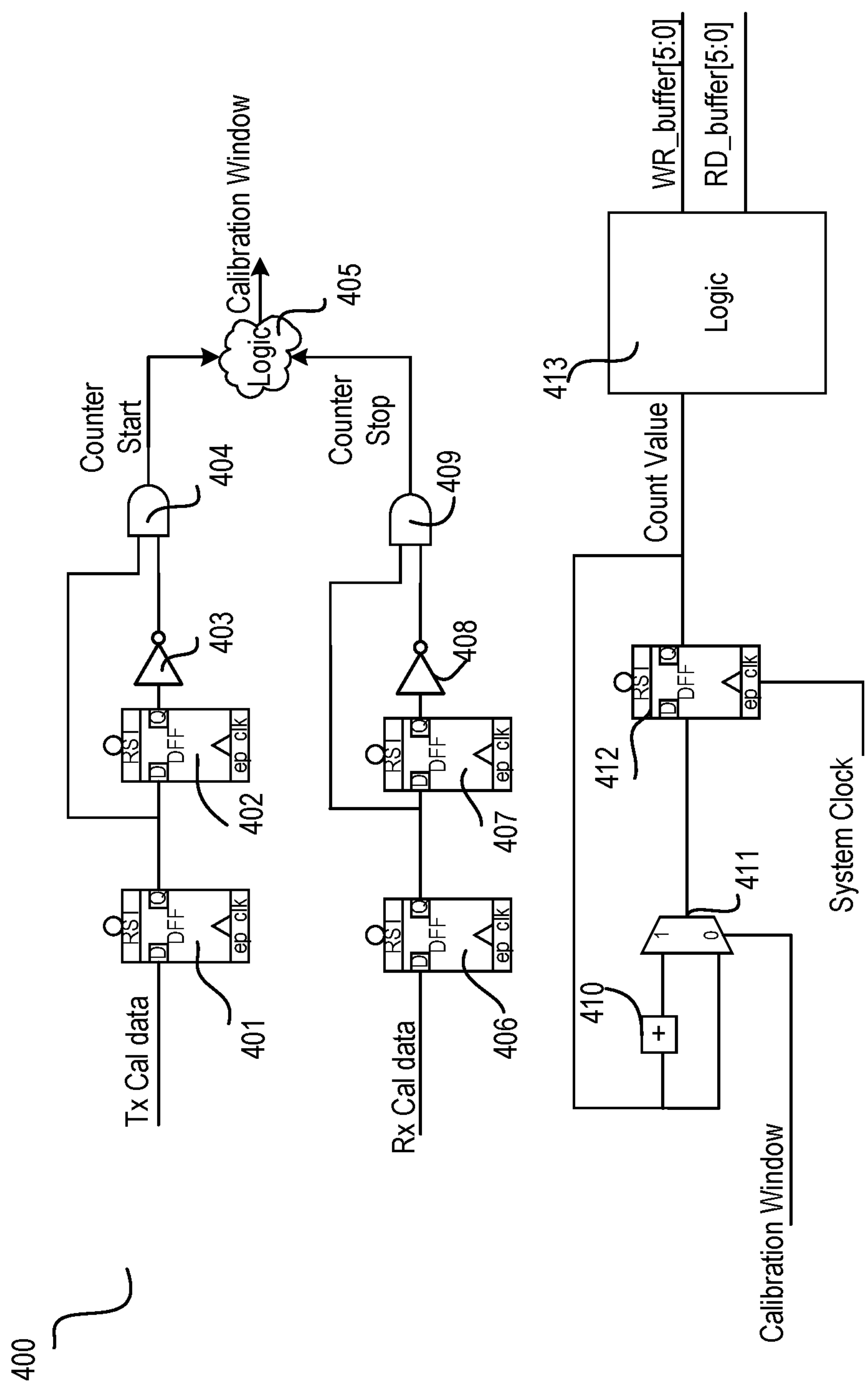
FIG. 4 illustrates a calibration circuit for use in FIGS. 2-3, according to some embodiments of the disclosure.

FIG. 4 illustrates calibration circuit 400 (e.g., Calibration Block 201*aa*) for use in FIGS. 2-3, according to some embodiments of the disclosure. It is pointed out that those elements of FIG. 4 having the same reference numbers (or names) as the elements of any other figure can operate or function in any manner similar to that described, but are not limited to such.

In some embodiments, calibration circuit 400 comprises flip-flops 401, 402, 406, 407, and 412; inverters 403 and 408, AND logic gates 404 and 409, logic 405 (e.g., NOR gate), adder 410, multiplexer 411, and logic 413 coupled together as shown. In some embodiments, after the to-be transmitted calibration data "Tx Cal data" is sampled by flip-flop 401, "Counter Start" pulse is generated by circuit arrangement having flip-flip 402, inverter 403, and AND gate 404. In some embodiments, after calibration data is received (e.g., after "Rx Cal data" is received) and sampled by flip-flop 406, "Counter Stop" pulse is generated by circuit arrangement having flip-flip 407, inverter 408, and AND gate 409. In some embodiments, "Counter Start" and "Counter Stop" pulses are then used by Logic 405 to generate a "Calibration Window" pulse which indicates the start and the end of the calibration period.

In some embodiments, "Calibration Window" pulse is used to cause the counter to count up or hold the count. For example, when "Calibration Window" pulse is high, multiplexer 411 increments "Count Value" by adder 410, and when "Calibration Window" pulse is low (e.g., when calibration has ended), multiplexer 411 causes the Count Value to remain at its previous value. In some embodiments, Logic 413 generates adjustment codes (e.g., WR_buffer[5:0] and RD_buffer[5:0]) for the write and read clock buffers 201*ab* and 201*ac*, respectively.

Figure 5:
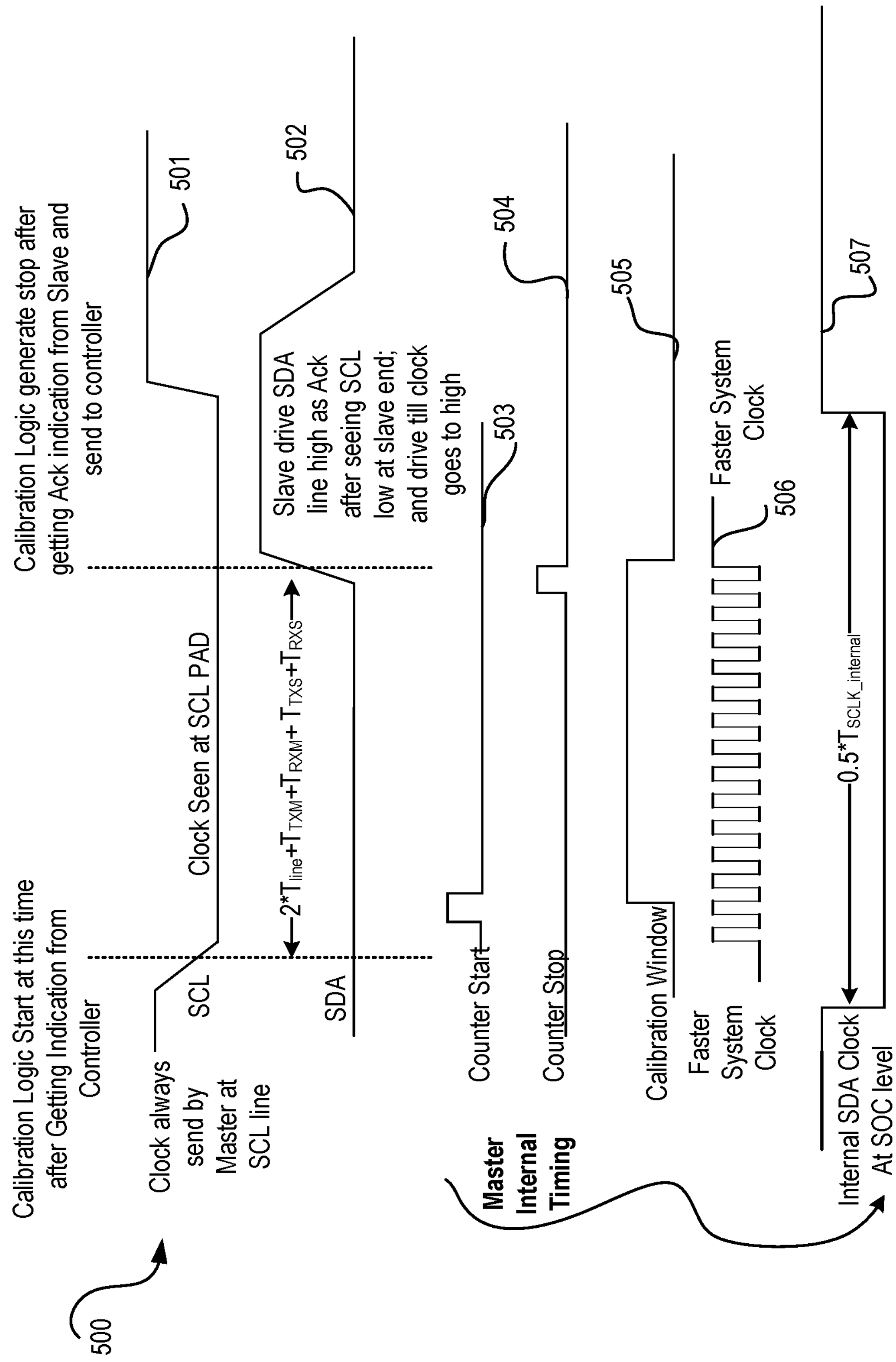
FIG. 5 illustrates a timing diagram of the apparatus, according to some embodiments of the disclosure.

FIG. 5 illustrates timing diagram 500 of the apparatus, according to some embodiments of the disclosure. It is pointed out that those elements of FIG. 5 having the same reference numbers (or names) as the elements of any other figure can operate or function in any manner similar to that described, but are not limited to such.

Timing diagram 500 shows clock signal SCL 501 transmitted by buffer 201*k* over second transmission line 107, data 502 "SDA" on first transmission line 106, Counter Start pulse 503, Counter Stop pulse 504, Calibration Window 505, Faster System Clock 506 (e.g., "Clk" from System Clock Source 201*h*), and Internal data clock 507 (or SDA Clock) at system-on-chip (SOC) level (e.g., clock provided to Master Controller 201*b* and other logics of Master Device 201).

In some embodiments, after SCL clock 501 transitions to low from high, Calibration logic 201*aa* enables Counter Start pulse 503 which enables the counter to start counting. In some embodiments, after receiving a Slave response at SDA line (e.g., first transmission line 106), Calibration block 201*aa* generates Counter Stop pulse 504 and defines the actual Calibration Window 505 (e.g., read window). During Calibration Window 505, counter samples the delay information using the counter which is function of $T_{readwindow}/T_{SysClock}$. In some embodiments, the count value is then used for adjusting read/write clock buffers 201*ac* and 201*ab* and also holds write data by disabling data path via multiplexer 301*b*.

Figure 6:
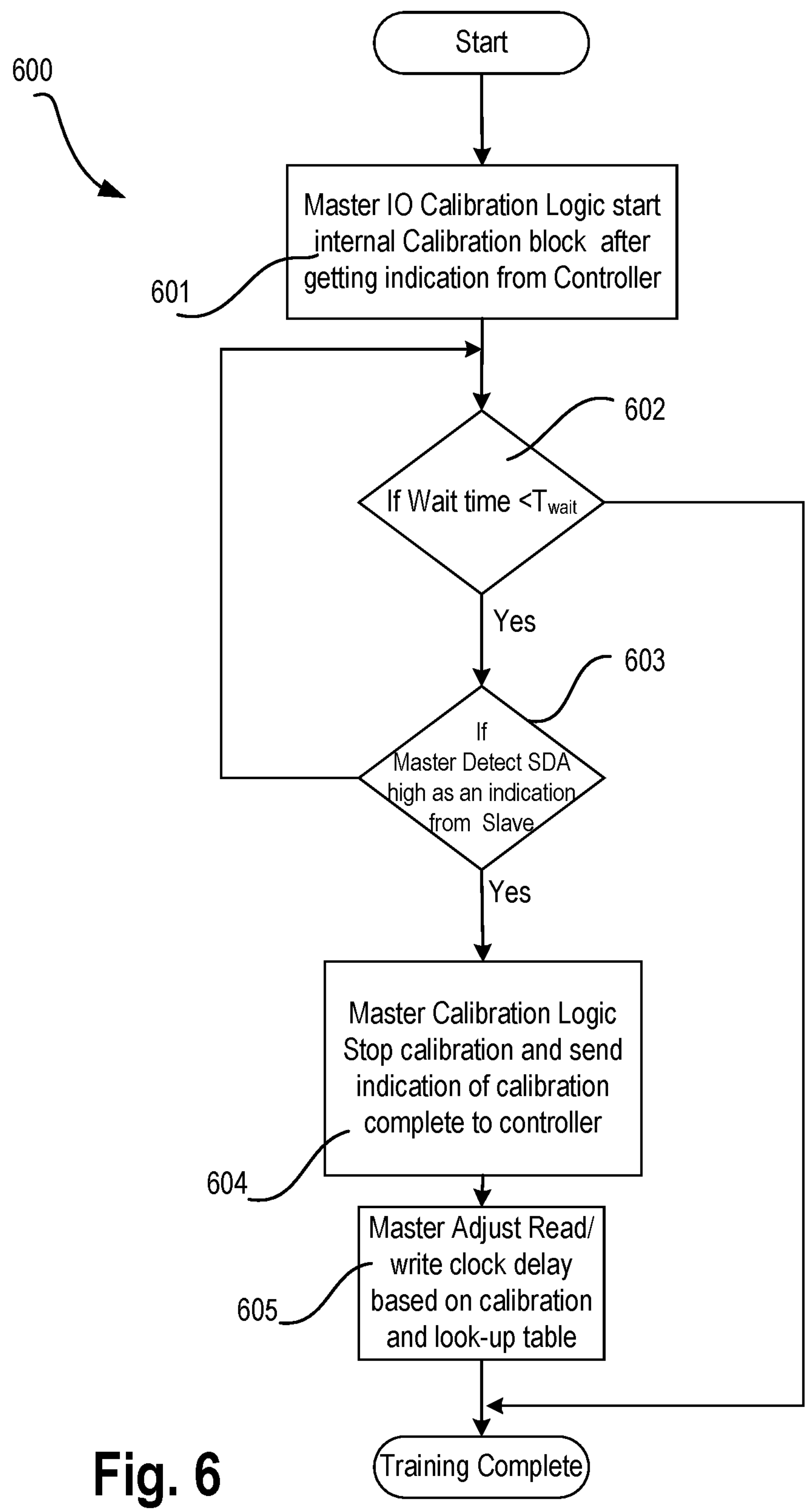
FIG. 6 illustrates a flowchart of a method for adaptively adjusting read and/or write clock delay, according to some embodiments of the disclosure.

FIG. 6 illustrates flowchart 600 of a method for adaptively adjusting read and/or write clock delay, according to some embodiments of the disclosure. It is pointed out that those elements of FIG. 6 having the same reference numbers (or names) as the elements of any other figure can operate or function in any manner similar to that described, but are not limited to such.

Although the blocks in the flowchart with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations.

The process below can be performed by a Finite State Machine (FSM). The FSM can be implemented in hardware only, software only, or a combination of both. In this example, the FSM is a hardware based FSM which may have some control capability via a controller.

At block 601, Master Device 201 starts the calibration process by issuing "Calibration EN" signal (same as "Calibration Enable" signal) after getting such indication from Master controller 201*b*. At block 602, Calibration block 201*aa* determines whether the SDA line (e.g., transmission line 106) received a response. For example, Calibration block 201*aa* determines whether receiver 201*g* detects a high logic level on the SDA line within a wait time which is less than $T_{wait}$. If wait time is less than $T_{wait}$, the process proceeds to block 603. Otherwise, the training is considered complete.

At block 603, a determination is made whether receiver 201*g* output went high after waiting more than $T_{wait}$. If receiver 201*g* output did not go high after waiting more than $T_{wait}$ then the training is ended and an indication is sent to Master controller 201*b* that the training is incomplete. If receiver 201*g* detects a high within $T_{wait}$ time frame then, then the process proceeds to block 604. If receiver 201*g* does not detect high within $T_{wait}$ time frame then the process returns to block 602 and the counter counts up till the counter shows more than $T_{wait}$. Otherwise, the process proceeds to block 604. At block 604, Calibration block 201*aa* stops the calibration process and the Counter Stop pulse is generated and an indication is sent to Master controller 201*b* that training is complete. At block 605, Calibration block 201*aa* adjusts the write/read clock buffers 201*ab/ac* based on the Count Value which is tallied with a LUT to determine the appropriate delay setting for the write/read clock buffers 201*ab/ac*.

Figure 7:
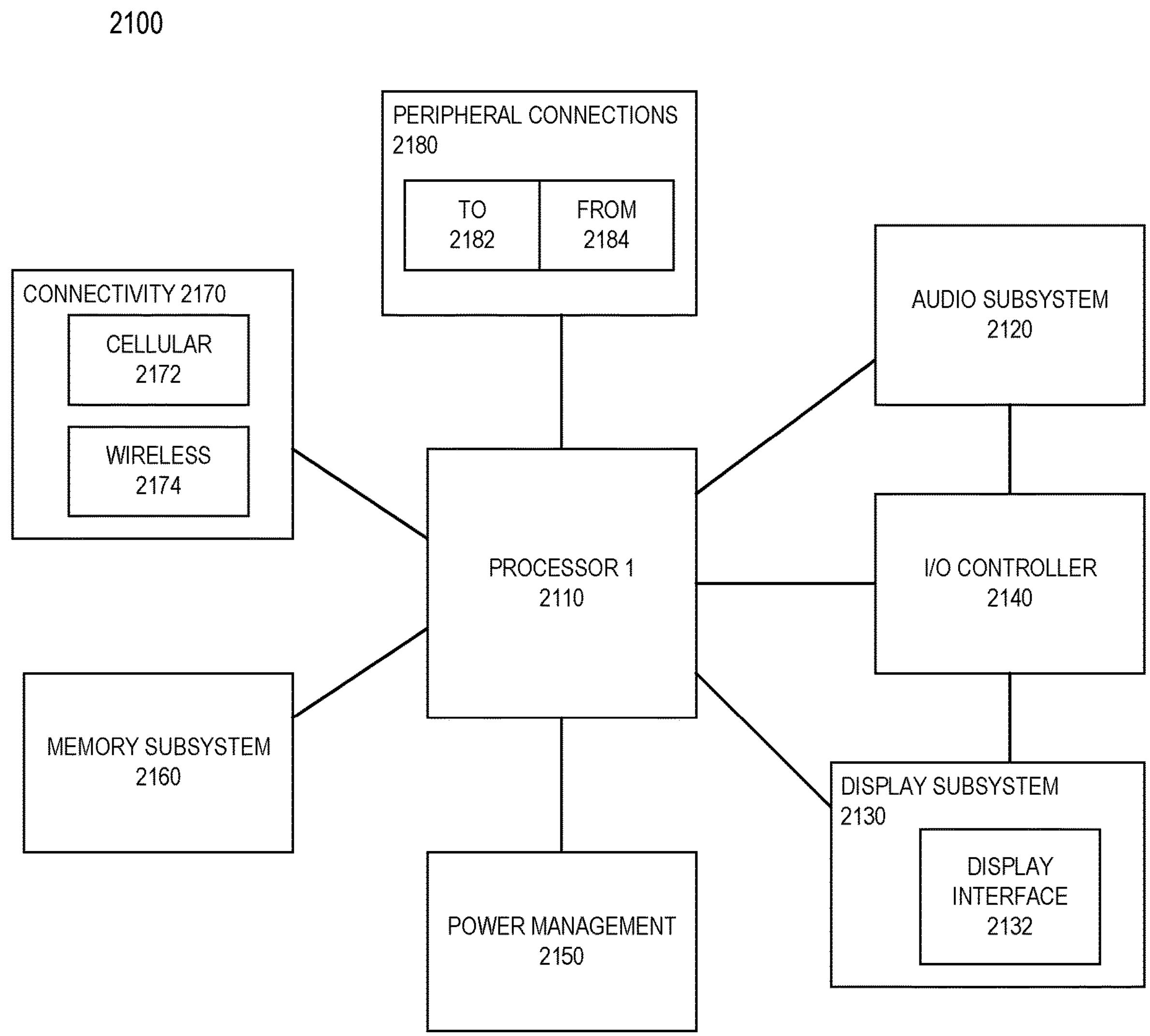
FIG. 7 illustrates a smart device or a computer system or a SoC (System-on-Chip) with apparatus for adaptive read/write clock timing, according to some embodiments.

FIG. 7 illustrates a smart device or a computer system or a SoC (System-on-Chip) with apparatus for adaptive read/ write clock timing, according to some embodiments. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure.

Any of the blocks here may include the apparatus with adaptive read for multi-drop bus technology.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions. The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. Various embodiments here can be can be combined with any of the other embodiments thereby allowing various combinations.

Example 1 is an apparatus provided which comprises: a data circuitry to send and receive data to and from one or more devices coupled to the data circuitry via a first transmission line; and a first adjustable clock buffer coupled to the data circuitry, wherein the first adjustable clock buffer is to adjust a delay to an edge of a read clock according to a response time of the one or more devices.

Example 2 includes all features of claim 1, wherein the apparatus of example 2 comprises a second adjustable clock buffer coupled to the data circuitry, wherein the second adjustable clock buffer is to adjust a delay to an edge of a write clock.

Example 3 includes all features of claim 1, wherein the apparatus of example 3 comprises logic to halt sending of data by the data circuitry when a propagation delay of the first adjustable clock buffer is being adjusted.

Example 4 includes all features of example 3, wherein the apparatus of example 4 comprises a clock circuitry which is to send a clock to the one or more devices, wherein the logic is to enable a counter to start counting after the clock circuitry is to send the clock to the one or more devices over a second transmission line.

Example 5 includes all features of example 4, wherein the one or more devices are to send one or more acknowledgement signals over the first transmission line to the data circuitry after the clock is to be received from the clock circuitry.

Example 6 includes all features of example 4, wherein the counter is to count using a clock having a frequency faster than a frequency of the clock sent by the clock circuitry.

Example 7 includes all features of example 4, wherein the one or more devices are to cause data on the first transmission line to be pulled high after the clock is to be received from the clock circuitry.

Example 8 includes all features of example 7, wherein the logic is to stop the counter from counting after the data circuitry is to detect that the data on the first transmission line is pulled high.

Example 9 includes all features of example 1, wherein the data circuity is I3C compliant data circuitry.

Example 10 includes all features of example 1, wherein the first transmission line is a multi-drop sensor bus.

Example 11 includes all features of example 1, wherein the one or more devices are connected to Multi-drop sensor bus devices.

Example 12 is an apparatus which comprises: a first driver to be coupled to one or more devices by a first transmission medium, wherein the first driver is to transmit data according to a write clock; a second driver to transmit a clock to the one or more devices coupled to the second driver by a second transmission medium; a receiver to be coupled to the first transmission medium, wherein the receiver is to sample data according to a read clock, wherein the data is to be received over the first transmission medium, and wherein the read clock and the write clock are to be derived from the clock; and logic coupled to the receiver, wherein the logic is to adjust a delay to the read or write clock according to the receiver receiving the data.

Example 13 includes all features of example 12, wherein the logic is to halt transmitting of data by the first driver when a propagation delay of a read clock buffer is being adjusted to adjust a delay of the read clock.

Example 14 includes all features of example 12, wherein the logic is to enable a counter to start counting after the second driver is to transmit the clock to the one or more devices over a second transmission line.

Example 15 includes all features of example 14, wherein the counter is to count using a clock having a frequency faster than a frequency of the clock transmitted by the second driver.

Example 16 includes all features of example 12, wherein the one or more devices are to send one or more acknowledgement signals over the first transmission medium to the receiver after the clock is to be received from the second driver.

Example 17 includes all features of example 12, wherein the one or more devices are to cause data on the first transmission medium to be pulled high after the clock is to be received from the second driver.

Example 18 includes a system which comprises: a memory; a processor coupled to the memory, the processor having an apparatus which comprises an apparatus according to any one of examples 1 to 11; and a wireless interface to allow the processor to communicate with another device.

Example 19 includes a system which comprises: a memory; a processor coupled to the memory, the processor having an apparatus which comprises an apparatus according to any one of examples 12 to 17; and a wireless interface to allow the processor to communicate with another device.

Example 20 is a method which comprises: sending and receiving data to and from one or more devices a first transmission line; and adjusting an edge of a read clock according to a response time of the one or more devices.

Example 21 includes all features of example 20, wherein the method of example 21 comprises adjusting a delay to an edge of a write clock.

Example 22 includes all features of example 20, wherein the method of example 22 comprises halting sending of data when a propagation delay of a first adjustable clock buffer is being adjusted.

Example 23 includes all features of example 22 which comprises: sending a clock to the one or more devices; and enabling a counter to start counting after sending the clock to the one or more devices over a second transmission line.

Example 24 includes all features of example 23, wherein the method of example 24 comprises: sending one or more acknowledgement signals over the first transmission line after the clock is to be received.

Example 25 includes all features of example 24, wherein the method of example 25 comprises counting using a clock having a frequency faster than a frequency of the clock sent by a clock circuitry.

Example 26 includes all features of example 25, wherein the method of example 26 comprises causing data on the first transmission line to be pulled high after the clock is to be received from the clock circuitry.

Example 27 includes all features of example 26, wherein the method of example 27 comprises stopping the counter from counting after detecting that the data on the first transmission line is pulled high.

Example 28 includes all features of example 20, wherein the first transmission line is a multi-drop sensor bus.

Example 29 includes all features of example 20, wherein the one or more devices are connected to Multi-drop sensor bus devices.

Example 30 is an apparatus which comprises: means for sending and receiving data to and from one or more devices a first transmission line; and means for adjusting an edge of a read clock according to a response time of the one or more devices.

Example 31 includes all features of example 30, wherein the apparatus of example 31 comprises means for adjusting a delay to an edge of a write clock.

Example 32 includes all features of example 31, wherein the apparatus of example 30 comprises means for halting sending of data when a propagation delay of a first adjustable clock buffer is being adjusted.

Example 33 includes all features of example 32, wherein the apparatus of example 32 comprises: means for sending a clock to the one or more devices; and means for enabling a counter to start counting after sending the clock to the one or more devices over a second transmission line.

Example 34 includes all features of example 33, wherein the apparatus of example 34 comprises means for sending one or more acknowledgement signals over the first transmission line after the clock is to be received.

Example 35 includes all features of example 34, wherein the apparatus of example 34 comprises means for counting using a clock having a frequency faster than a frequency of the clock sent by a clock circuitry.

Example 36 includes all features of example 35, wherein the apparatus of example 36 comprises means for causing data on the first transmission line to be pulled high after the clock is to be received from the clock circuitry.

Example 37 includes all features of example 36, wherein the apparatus of example 37 comprises means stopping the counter from counting after detecting that the data on the first transmission line is pulled high.

Example 38 includes all features of example 37, wherein the first transmission line is a multi-drop sensor bus.

Example 39 includes all features of example 38, wherein the one or more devices are connected to Multi-drop sensor bus devices.

Example 40 is a system which comprises: a memory; a processor coupled to the memory, the processor having an apparatus which comprises an apparatus according to any one of examples 30 to 39; and a wireless interface to allow the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:

a data circuitry to send and receive data to and from one or more devices coupled to the data circuitry via a transmission line; and an adjustable clock buffer coupled to the data circuitry, wherein the adjustable clock buffer is to adjust a delay to an edge of a read clock according to a response time of the one or more devices, and wherein the one or more devices are to send one or more acknowledgement signals over the transmission line to the data circuitry after a clock is to be received from a clock circuitry.

2. The apparatus of claim 1, wherein the adjustable clock buffer is a first adjustable clock buffer, wherein the apparatus comprises a second adjustable clock buffer coupled to the data circuitry, and wherein the second adjustable clock buffer is to adjust a delay to an edge of a write clock.

3. The apparatus of claim 1 comprises logic to halt transport of data by the data circuitry when a propagation delay of the adjustable clock buffer is being adjusted.

4. The apparatus of claim 3, wherein the transmission line is a first transmission line, wherein the clock circuitry is to send the clock to the one or more devices, and wherein the logic is to enable a counter to start to count after the clock circuitry is to send the clock to the one or more devices over a second transmission line.

5. The apparatus of claim 4, wherein the counter is to count with a clock having a frequency faster than a frequency of the clock sent by the clock circuitry.

6. The apparatus of claim 4, wherein the one or more devices are to cause data on the first transmission line to be pulled high after the clock is to be received from the clock circuitry.

7. The apparatus of claim 6, wherein the logic is to stop the counter to count after the data circuitry is to detect that the data on the first transmission line is pulled high.

8. The apparatus of claim 1, wherein the data circuity is I3C compliant data circuitry.

9. The apparatus of claim 1, wherein the transmission line is a multi-drop sensor bus.

10. The apparatus of claim 1, wherein the one or more devices are connected to Multi-drop sensor bus devices.

11. An apparatus comprising:

a first driver to be coupled to one or more devices by a first transmission medium, wherein the first driver is to transmit data according to a write clock;

a second driver to transmit a clock to the one or more devices coupled to the second driver by a second transmission medium;

a receiver to be coupled to the first transmission medium, wherein the receiver is to sample data according to a read clock, wherein the data is to be received over the first transmission medium, and wherein the read clock and the write clock are to be derived from the clock; and logic coupled to the receiver, wherein the logic is to adjust a delay to the read or write clock according to the receiver in receipt of the data, and wherein the one or more devices are to send one or more acknowledgement signals over the first transmission medium to the receiver after the clock is to be received from the second driver.

12. The apparatus of claim 11, wherein the logic is to halt transmission of data by the first driver when a propagation delay of a read clock buffer is being adjusted to adjust a delay of the read clock.

13. The apparatus of claim 11, wherein the logic is to enable a counter to start to count after the second driver is to transmit the clock to the one or more devices over a second transmission line.

14. The apparatus of claim 13, wherein the counter is to count with a clock having a frequency faster than a frequency of the clock transmitted by the second driver.

15. The apparatus of claim 11, wherein the one or more devices are to cause data on the first transmission medium to be pulled high after the clock is to be received from the second driver.

16. A system comprising:

a memory;

a processor coupled to the memory, the processor having an apparatus which comprises:

a data circuitry to send and receive data to and from one or more devices coupled to the data circuitry via a multi-drop sensor bus; and a adjustable clock buffer coupled to the data circuitry, wherein the adjustable clock buffer is to adjust a delay to an edge of a read clock according to a response time of the one or more devices, and wherein the one or more devices are to send one or more acknowledgement signals over the transmission line to the data circuitry after a clock is to be received from a clock circuitry; and a wireless interface to allow the processor to communicate with another device.

17. The system of claim 16, wherein the adjustable clock buffer is a first adjustable clock buffer, wherein the apparatus comprises a second adjustable clock buffer coupled to the data circuitry, and wherein the second adjustable clock buffer is to adjust a delay to an edge of a write clock.

18. The system of claim 16, wherein the apparatus comprises logic to halt transport of data by the data circuitry when a propagation delay of the adjustable clock buffer is being adjusted.

* * * * *